United States Patent [19]

Mann

[11] Patent Number: 5,752,680
[45] Date of Patent: May 19, 1998

[54] SPRING LOADED STRAIGHT LINE DEAD END CLAMP

[75] Inventor: Steven W. Mann, Mt. Olive, Ala.

[73] Assignee: Hubbell Incorporated, Orange, Conn.

[21] Appl. No.: 650,794

[22] Filed: May 20, 1996

[51] Int. Cl.⁶ ........................................ F16L 3/00
[52] U.S. Cl. .................... 248/63; 248/65; 248/67.5; 248/67.7; 248/74.1; 248/74.4; 24/132 R; 24/489; 24/495
[58] Field of Search ................. 248/65, 67.5, 67.7, 248/74.1, 74.4, 316.1, 316.5, 230.1, 230.4, 63, 292.13; 24/122.6, 132 R, 133, 134 L, 489, 495; 16/254, 255, 256, 267, 285, 356

[56] References Cited

U.S. PATENT DOCUMENTS

| 2,734,222 | 2/1956 | Kiba ............................. 16/167 X |
| 2,836,709 | 5/1958 | Van Dusen, Jr. ................. 16/267 X |
| 2,997,764 | 8/1961 | Lantz et al. ..................... 24/135 |
| 3,274,654 | 9/1966 | Becker ........................... 24/125 |
| 3,470,528 | 9/1969 | Farrington, Jr. et al. ........ 339/265 |
| 4,383,668 | 5/1983 | Hall ............................. 248/63 |
| 4,445,657 | 5/1984 | Breckenridge .................. 24/489 X |
| 4,969,616 | 11/1990 | Apperson et al. .............. 248/63 |
| 5,175,672 | 12/1992 | Conner et al. ................. 248/923 X |
| 5,594,976 | 1/1997 | Shkolnik et al. ............... 16/254 X |

Primary Examiner—Leslie A. Braun
Assistant Examiner—Donald J. Wallace
Attorney, Agent, or Firm—Jerry M. Presson; Thomas P. Hilliard

[57] ABSTRACT

A clamp for a line includes a body having a first portion for engaging the line and a keeper having a second portion for engaging the line. A pivoting assembly is coupled to the body and the keeper for pivotally coupling the keeper and the body, and includes a shaft and a shaft support pivotally receiving the shaft. The shaft has a longitudinal axis and pivots about the longitudinal axis. The clamp also includes a torsional spring coupled to the pivoting assembly for biasing the keeper second portion away from the body first portion. Further, the clamp includes a control device in the form of U-bolts, coupled to the body and the keeper, for controlling the angular position of the keeper relative to the body.

26 Claims, 5 Drawing Sheets

5,752,680

1

SPRING LOADED STRAIGHT LINE DEAD END CLAMP

FIELD OF THE INVENTION

This invention relates generally to a cable clamp for clamping an electrical cable in overhead transmission lines. More specifically, the invention relates to a spring loaded straight line dead end clamp that has a pivoting keeper to secure the cable to the body of the clamp. The pivot axis of the keeper is fully captured by the body, thus enabling the use of an internal torsion spring that is not easily dislodged, and fasteners that can be tightened in any sequence.

BACKGROUND OF THE INVENTION

Clamping an electrical cable in overhead transmission lines is made easier with the use of a cable clamp that can be installed without removing the clamping hardware or cutting the associated cable. A straight line type clamp is preferable since it is simpler to manipulate and does not require disassembly of the clamp or cutting of the cable.

Conventional straight line dead end cable clamps have a body for receiving the cable and a keeper for clamping the cable to the body. One or more bolts secure the keeper to the body, and a clevis attaches the cable clamp to a supporting structure such as a power insulator string.

Conventional straight line dead end cable clamps have numerous disadvantages. Many conventional clamps use non-captive pivot connections between the keeper and the body. This results in the keeper easily separating from the body during the connection of the cable to the clamp. Additionally, many conventional clamps have external springs for maintaining the keeper and the body in an open position for receiving the cable. However, external springs are easily dislodged during connection of the cable to the clamp. Furthermore, the use of external springs requires the fasteners or tightening bolts securing the keeper to the body to be tightened in a specific sequence to prevent damage to the external springs. This is time consuming and tedious for the installer.

Examples of the conventional clamps are disclosed in the following U.S. Pat. Nos: 2,997,764 to Lantz et al; 3,274,654 to Becker; 3,470,528 to Farrington, Jr. et al; 4,383,668 to Hall; and 4,969,616 to Apperson et al.

Thus, there is a continuing need to provide improved straight line dead end clamps.

SUMMARY OF THE INVENTION

Accordingly, it is a primary object to provide a clamp that can easily connect a cable to a structure.

Another object of the invention is to provide a straight line dead end clamp with a keeper that is pivotally coupled to a body along a captive pivot axis.

A further object of this invention is to provide a straight line dead end clamp that is spring loaded to bias a cable compression portion of the keeper away from the body to facilitate receiving the cable within the clamp.

A further object of the invention is to provide a spring loaded straight line dead end clamp having an internal torsion spring that is not easily dislodged.

A further object of the invention is to provide a spring loaded straight line dead end clamp having fasteners that can be tightened in any sequence.

The foregoing objects are basically obtained by providing a clamp for a line comprising a body having a first portion for engaging the line; a keeper having a second portion for engaging the line; a pivot assembly, coupled to the body and keeper, for pivotally coupling the body and the keeper, the pivot assembly including a shaft and shaft support pivotally receiving the shaft, the shaft having a longitudinal axis and pivoting about the longitudinal axis; a bias element, coupled to the body and keeper, for biasing the keeper second portion away from the body first portion; and a control assembly, coupled to the body and keeper, for controlling the angular position of the keeper relative to the body.

Other objects, advantages and salient features of the invention will become apparent from the following detailed description, which, taken in conjunction with the annexed drawings, discloses preferred embodiments of the invention.

DRAWINGS

Referring now to the drawings which form a part of this original disclosure:

DETAILED DESCRIPTION OF THE INVENTION

Figure 1:
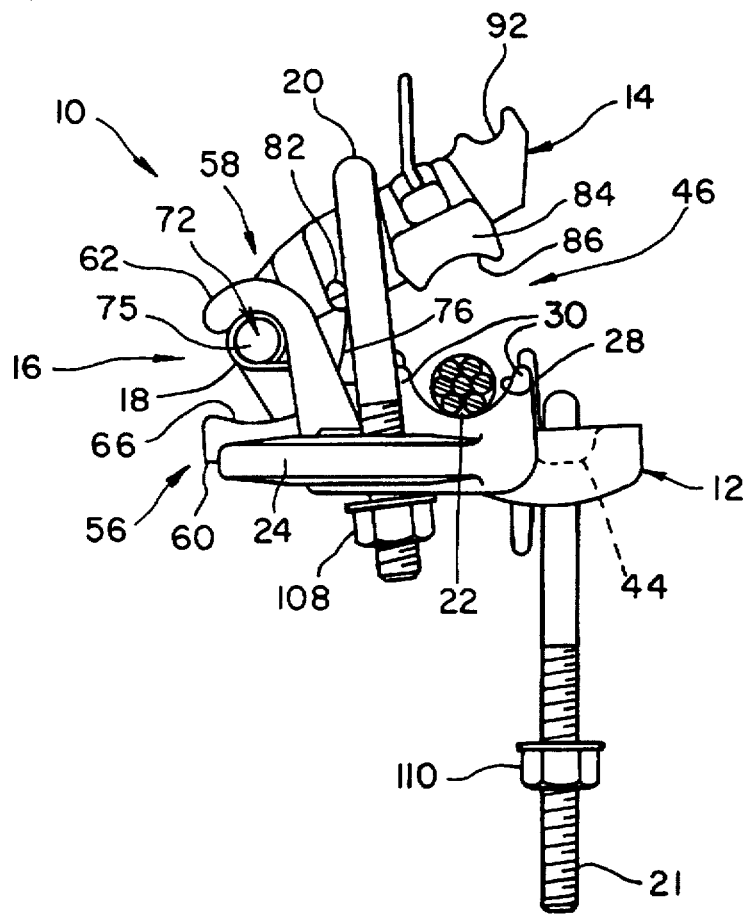
FIG. 1 is a front elevational view of the clamp in accordance with the invention with the clamp in the open position and the cable inserted within the clamp.

As seen in FIG. 1–8, the spring loaded straight line dead end clamp 10 in accordance with the invention comprises a body 12; a keeper 14; a pivoting means or assembly 16 coupled to the body 12 and to the keeper 14; a bias means in the form of a torsion spring 18; and a control means in the form of fasteners, including first and second U-bolts 20 and 21, respectively. A line or cable 22 is secured within the clamp 10 between the body 12 and the keeper 14 as seen in FIGS. 1–4.

Figure 2:
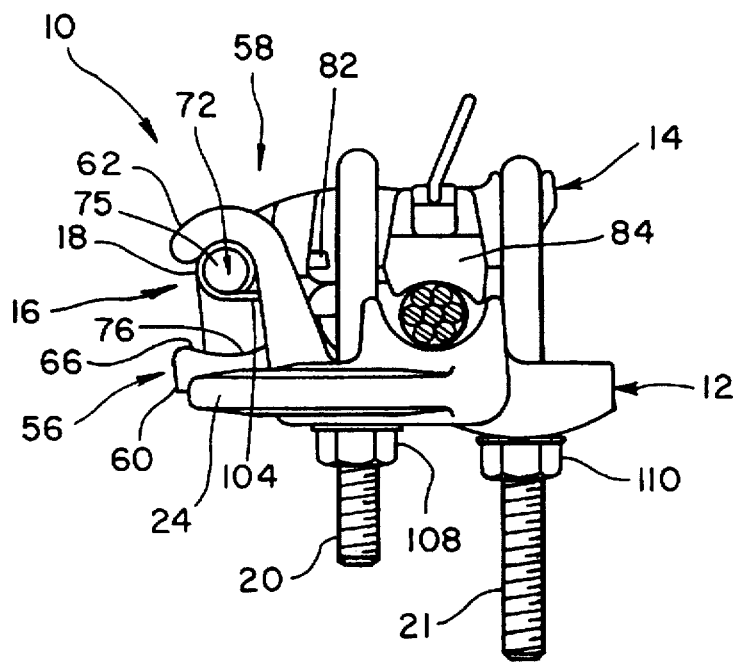
FIG. 2 is a front elevational view of the clamp similar to FIG. 1, but showing the clamp in the closed position around the cable.
Figure 3:
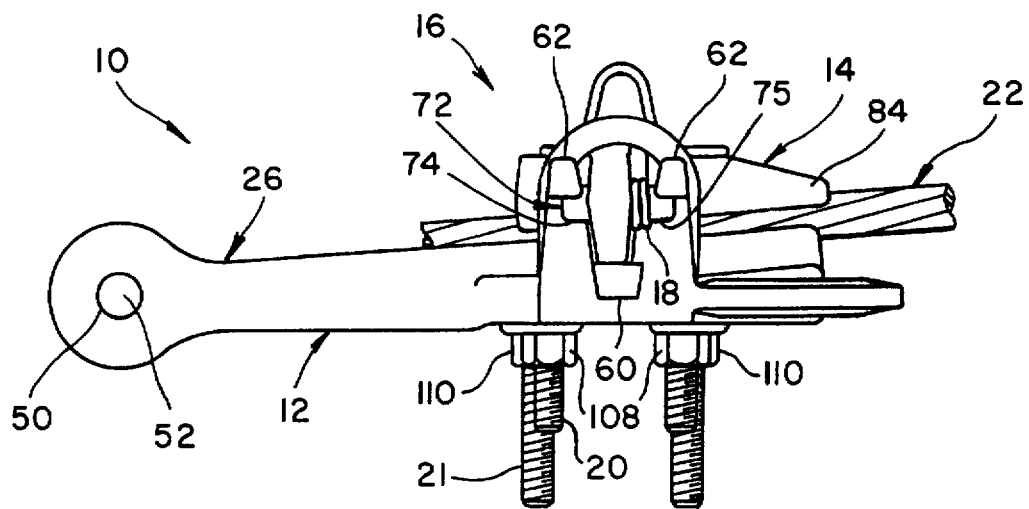
FIG. 3 is a left side elevational view of the clamp in accordance with the invention in the closed position around the cable.

The pivoting assembly 16 allows the keeper 14 and the body 12 to pivot relative to each other such that, when the clamp 10 is in an open position, as seen in FIG. 1, the cable 22 is easily inserted into the clamp 10 without disassembling the clamp 10. Spring 18 maintains the clamp 10 in the open position until the U-bolts 20 and 21 are tightened to bring the keeper 14 and the body 12 securely together to a closed position, as seen in FIG. 2.

Figure 4:
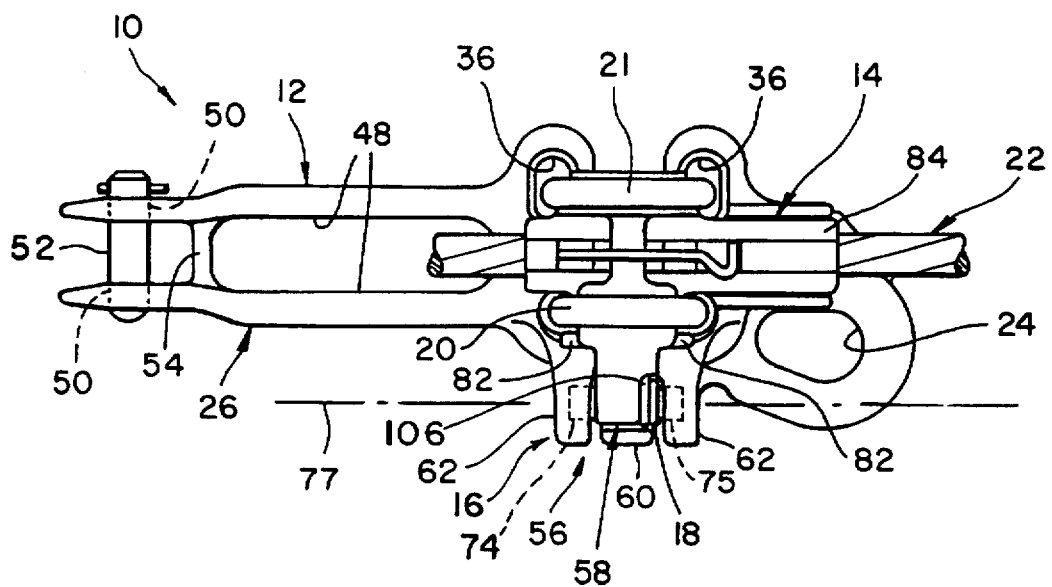
FIG. 4 is a top plan view of the clamp in accordance with the invention in the closed position around the cable.
Figure 5:
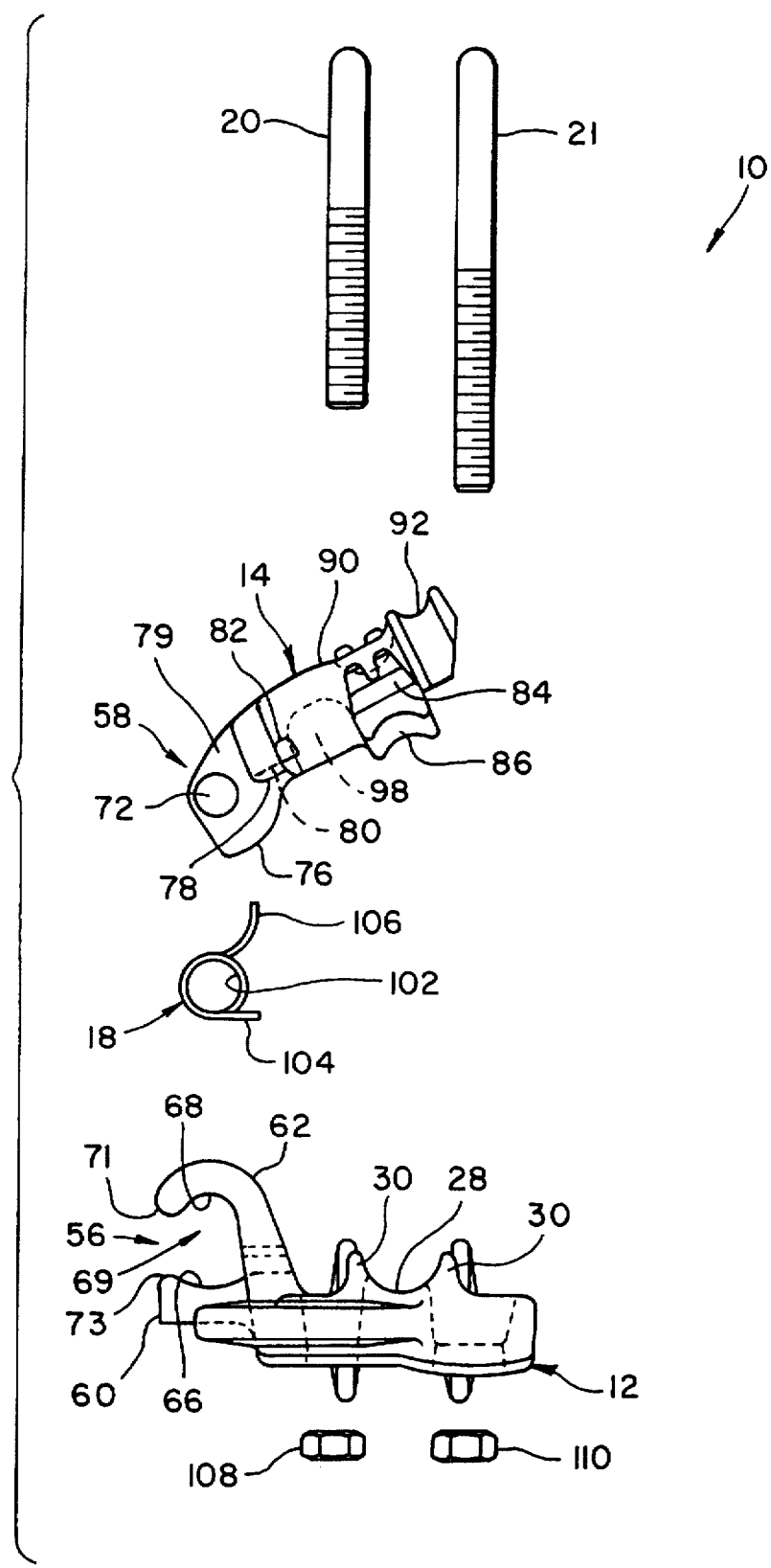
FIG. 5 is an exploded front elevational view of the clamp in accordance with the invention showing the body, U-bolts, spring, nuts, and keeper.

As seen in FIGS. 3–7, body 12 is an elongated member with a pulling eye 24 at one end and a clevis 26 at the other end. Between the pulling eye 24 and the clevis 26, a longitudinal portion or groove 28 extends longitudinally from the clevis 26 to the pulling eye 24. As seen in FIG. 5, the longitudinal groove 28 is a concave recess having upwardly extending sides 30, and is unobstructed by other elements of the body 12. The longitudinal groove 28 is sized to receive the cable 22 therein, with the sides 30 of the groove 28 resisting lateral movement of the cable 22.

Figure 7:
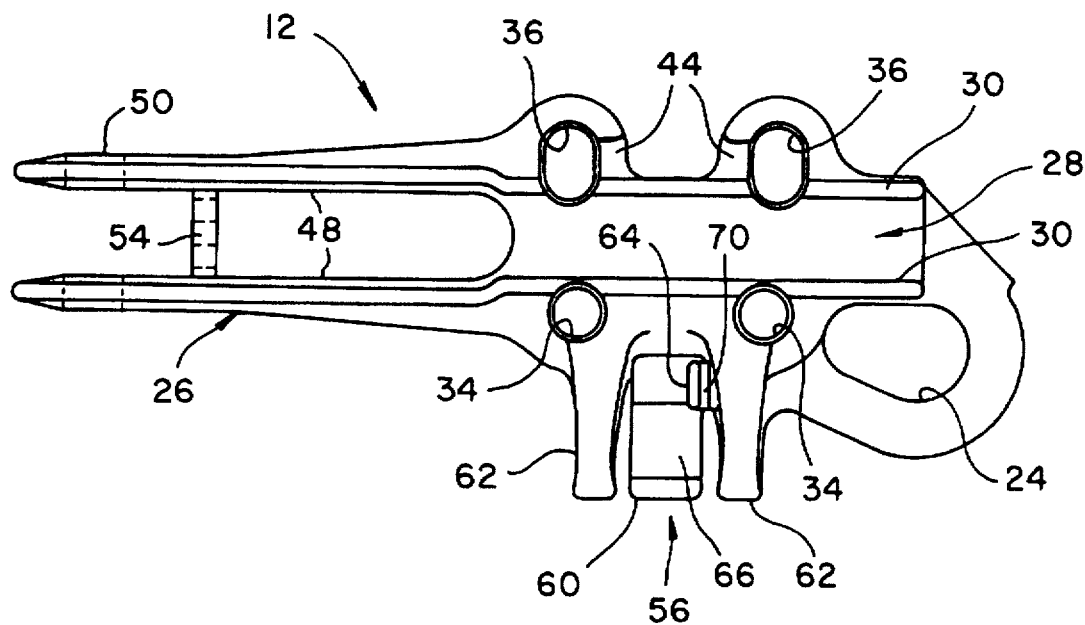
FIG. 7 is a top plan view of the body of the clamp in accordance with the invention.

As seen in FIG. 7, two circular apertures or holes 34 are located on one side of the longitudinal groove 28, while two slotted apertures or slots 36 are located on the other side of the longitudinal groove 28. The circular holes 34 are sized to receive the first U-bolt 20 while the slots 36 are sized to receive the second U-bolt 21. The slots 36 give the second U-bolt 21 pivoting room so that the U-bolt 21 may be easily positioned around the keeper 14 after the cable 22 has been placed within the clamp 10. This is described in greater detail below.

Also seen in FIG. 7, the body 12 has two recesses 44 adjacent the slots 36. As seen in FIG. 1, the recesses 44 enable the second U-bolt 21 to sit low within the body 12 such that an opening 46 between the keeper and the body is as large as possible for receiving the cable 22 between the body 12 and the keeper 14 when the clamp 10 is in the open position.

As seen in FIG. 4, the clevis 26 of the body 12 has two arms 48, each arm 48 having a clevis hole 50 remote from the pulling eye 24 for receiving therein a clevis pin 52. Between the two clevis arms 48, a clevis stiffener 54 provides additional stiffening to the clevis 26.

Figure 6:
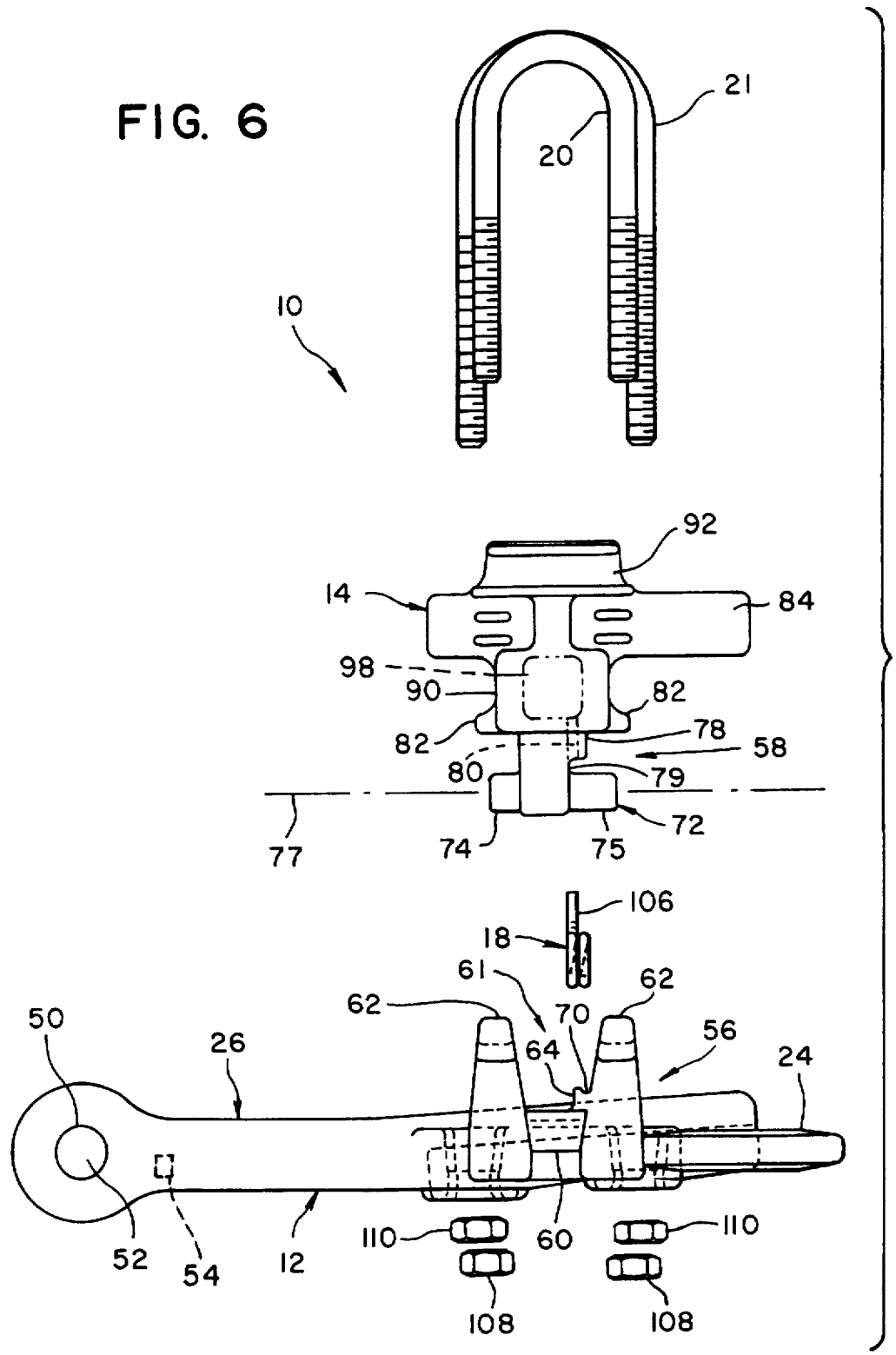
FIG. 6 is an exploded left side elevational view of the clamp in accordance with the invention showing the body, U-bolts, spring, nuts, and keeper.

The pivoting assembly 16, as seen in FIGS. 1 and 2, comprises a body section or support 56 and a keeper section or shaft keeper pivoting end 58. The keeper pivoting end 58 will be described in more detail below. As seen most clearly in FIGS. 5 and 6, the body section or shaft support 56 comprises a support base 60, two support fingers 62, and a body spring holder 64. The support base 60 extends outwardly from the body 12 and has an upper concave surface 66. The two support fingers 62 extend upwardly substantially parallel to one another from the body 12 with one support finger 62 located on each side of the support base 60 and defining a slot 61 there between. Each support finger 62 has a lower curved area 68 in the form of a portion of a circle extending about 170°–180°. As seen in FIG. 5, a receiving slot 69 is located between the tips 71 of the fingers 62 and the uppermost portion 73 of the base 60. As seen in FIG. 6, the body spring holder 64 is located between the two support fingers 62, adjacent the support finger 62 closest to the pulling eye 24. A first spring groove 70 is located within the body spring holder 64 substantially perpendicular to the longitudinal groove 28 in the body 12 for receiving one end of the spring 18 as will be described in further detail below.

Keeper 14 is pivotally coupled to the body 12 by the keeper section or keeper pivoting end 58 of the pivoting assembly 16. As seen in FIGS. 5 and 6, keeper pivoting end 58 has a pivoting rod or shaft 72 formed from two aligned, coaxial trunnions 74 and 75. The trunnions 74 and 75 are substantially cylindrical and attached to opposite ends of the pivoting end 58 of the keeper 14, respectively. The radius of curvature of each trunnion 74 and 75 are substantially equal to each other and to the radius of curvature of the curved area 68 of the support fingers 62. Thus, the trunnions 74 and 75 may be received by the fingers 62, adjacent their curved areas 68, and pivot within the curved areas 68 around pivot axis 77. As seen in FIGS. 4 and 6, the pivot axis 77 is the longitudinal axis of the rod 72. The size of trunnions 74 and 75 also enables the trunnions 74 and 75 to be inserted into the receiving slot 69 between the tips 71 of the two support fingers 62 and the uppermost portion 73 of the support base 60 to attach the keeper 14 to the body 12.

As seen in FIGS. 1, 2 and 5, the keeper pivoting end 58 also has a lower convex surface 76. The lower convex surface 76 has a radius of curvature substantially equal to the radius of curvature of the upper concave surface 66 of the support base 60. This allows the keeper pivoting end 58 to be supported vertically while pivoting relative to the body 12 and while in the closed position as seen in FIG. 2. In the closed position of FIG. 2, the lower convex surface 76 of the keeper pivoting end 58 mates with the upper concave surface 66 of the support base 60 of the body 12. When U-bolt 20 and nuts 108 are fully tightened, lower convex surface 76 engages upper concave surface 66. Therefore, when the U-bolts 20 and 21 are tightened and the keeper 14 is compressed against the body 12, a rigid connection exists between the keeper 14 and the body 12 at the pivoting assembly 16 as seen in FIG. 2. This rigid connection prevents displacement of the trunnions 74 and 75 and the pivot axis 77. The trunnions 74 and 75 are prevented from moving laterally out of engagement with the support fingers 62.

Figure 8:
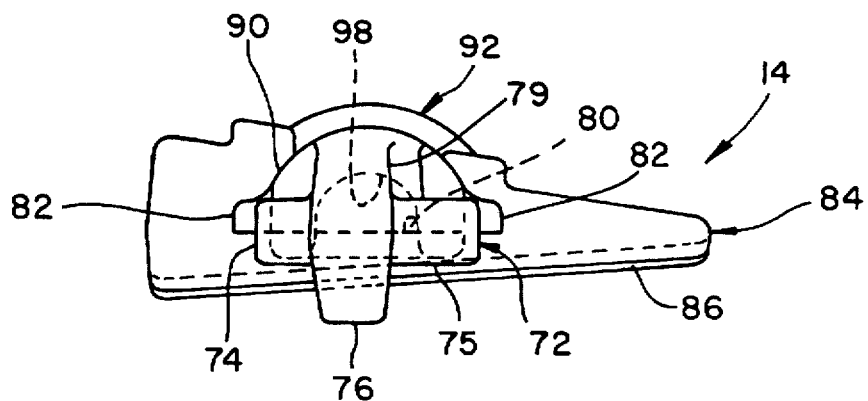
FIG. 8 is a left side elevational view of the keeper of the clamp in accordance with the invention.

As seen in FIGS. 5, 6 and 8, keeper pivoting end 58 also has a keeper spring holder 78 adjacent the forward side 79 of the keeper pivoting end 58. A second spring groove 80 is formed in the keeper spring holder 78 to receive the spring 18.

As seen in FIGS. 1, 6 and 8, inward from and adjacent to the pivoting end 58, the keeper 14 has two protrusions 82 located on opposite lateral sides of the keeper 14. The protrusions 82 extend from the keeper 14 substantially parallel to the pivot axis 77. When the first U-bolt 20 is positioned around the keeper 14, as will be described in greater detail below, the protrusions 82 maintain the first U-bolt 20 in a substantially vertical orientation, as seen in FIG. 1, to facilitate tightening of the clamp 10. The protrusions 82 are particularly useful in maintaining the vertical orientation of the first U-bolt 20 when the second U-bolt 21 is tightened before the first U-bolt 20.

As seen in FIG. 2, opposite the pivoting end 58, the keeper 14 has a compression portion or member 84 to contact the cable 22 when the cable 22 is positioned within the clamp 10. As seen in FIGS. 1, 5 and 8, the compression member 84 comprises an elongated portion or channel 86 that extends substantially parallel to the longitudinal groove 28 of the body 12. The elongated channel 86 is of sufficient length to extend along the entire length of the longitudinal groove 28. The elongated channel 86 is concave for enclosing a portion of the cable 22, and in the closed position (FIG. 2) prohibits the cable 22 from moving from its position in the longitudinal groove 28.

As seen in FIGS. 2, 5 and 6, on either side of the compression member 84, the keeper 14 has first and second U-bolt receiving areas 90 and 92, respectively. The first U-bolt receiving area 90 is located between the protrusions 82 and the elongated channel 86 and is sized to receive the bight of the first U-bolt 20. The first U-bolt receiving area 90 is semi-circular, having a radius of curvature substantially equivalent to the radius of curvature of the bight of the first U-bolt 20. The second U-bolt receiving area 92 is a semi-circular groove. The radius of curvature of the second U-bolt receiving area 92 is substantially equal to the radius of curvature of the bight of the second U-bolt 21. Keeper 14 also has a hollow cavity 98 under the first U-bolt receiving area 90 to decrease the weight of the keeper 14 and increase its strength. As seen in FIG. 5, groove 80 is substantially perpendicular to channel 86 in the keeper 14.

As seen in FIGS. 5 and 6, the bias means or spring 18 is a torsional spring. The spring 18 is spirally configured and comprises a circular area 102 and first and second substantially straight ends 104 and 106, respectively, angularly spaced from one another in the rest position by about 90°. The circular area 102 is sized so that the pivoting rod or shaft 72 may be inserted within the circular area 102. More specifically, the spring 18 is placed around the longer trunnion 75 adjacent the forward side 79 of the keeper pivoting end 58 as seen in FIGS. 1, 2 and 4. The longer trunnion 75 extends into the circular area 102 while the first spring end 104 is received in the first spring groove 70 and the second spring end 106 is received in the second spring groove 80. Since the spring ends 104 and 106 will resist attempts to bring them together, the compression member 84 will be biased away from the longitudinal groove 28 (FIG. 1). Once a force sufficient to overcome the resistance of the spring 18 is applied to the keeper 14, the compression member 84 will pivot closer to the longitudinal groove 28 about longitudinal axis 77.

As shown in FIGS. 5 and 6, the first U-bolt 20 is shorter and has a smaller radius of curvature than the second, larger U-bolt 21. The smaller length of U-bolt 20 prevents the keeper 14 from pivoting beyond the open position shown in FIG. 1. This maintains the keeper 14 engaged in the shaft support 56. U-bolts 20 and 21 are tightened by two nuts 108 and two nuts 110, respectively. Both U-bolts 20 and 21 have the same diameter and accordingly, nuts 108 are the same size as nuts 110. This simplifies the tightening of the nuts 108 and 110 by requiring only one socket to tighten all four nuts 108 and 110. As seen in FIG. 1, the length of the first U-bolt 20 is sufficient to enable nuts 108, and any additional hardware (e.g., washers), to be attached to the first U-bolt 20 while the clamp 10 is in the open position. This facilitates the handling and the closing of the clamp 10. Likewise, the larger size of the second U-bolt 21 enables it to be placed in the second U-bolt receiving area 92 of the keeper 14, with nuts 110 and any additional hardware attached, before the keeper 14 has reached the closed position. Slots 36 also enable the second U-bolt 21 to pivot around area 92. The nuts 108 and 110 are then tightened, in any sequence, to bring the keeper 14 and the body 12 together to the closed position (FIG. 2). Since the first U-bolt 20 is closer to the pivot axis 77, the first U-bolt 20 need not be as long as the second U-bolt 21.

Cable or line 22 may be of any type. As an example, the cable or line 22 may be of the ACSR-type.

The body 12 and the keeper 14 are preferably cast of aluminum and sized according to the strength requirements of the particular installation. The body 12 and the keeper 14 may also be formed from cast bronze or galvanized ductile iron as required. The spring 18 is preferably made from stainless steel.

Assembly

The clamp 10 is assembled by simply engaging the keeper 14 and the body 12. Initially, the spring 18 is placed around the longer trunnion 75. The second end 106 of the spring 18 is placed within the second spring groove 80 on the keeper 14. The keeper 14 is then positioned so that its pivoting end 58 may be inserted into slot 61 and receiving slot 69 on the body 12. In other words, the keeper 14 is in a position equivalent to being pivoted 135º away from its horizontal orientation in the closed position, as seen in FIG. 2. The trunnions 74 are then inserted within the receiving slot 69, between the support base 60 and the support fingers 62, and engaged with the curved areas 68 of the fingers 62. The keeper 14 may now be initially pivoted towards the closed position. This initial pivoting brings the first spring end 104 to a position within the first spring groove 70. Since both first and second spring ends 104 and 106 are now received in their respective grooves 70 and 80, the elongated channel 86 on the keeper will be biased away from the longitudinal groove 28 in the body.

Manually forcing the elongated channel 86 closer to the longitudinal groove 28 by pivoting the keeper 14 angularly about pivot axis 77 relative to the body 12 will align the first U-bolt receiving area 90 on the keeper 14 with the circular holes 34 in the body 12. Then, the first U-bolt 20 may be inserted through the circular holes 34. The bight of the U-bolt 20 is then received in the first U-bolt receiving area 90. Nuts 108 are then attached to the first U-bolt 20. In this position, the upper concave surface 66 of the body 14 mates with the lower convex surface of the keeper pivoting end 58, as seen in FIG. 1. Thus, the keeper 14 is prohibited from disengaging with the body 12 under forces directed at the keeper in substantially any direction. The second U-bolt 21 is then placed in the slots 36 in the body 12 and nuts 110 are fastened to each end of the second U-bolt 21. The clamp 10, at this point, takes the configuration as shown in FIG. 1, and is ready to receive the cable 22.

When it is desired to attach the clamp 10 to a cable 22, the clamp 10 is positioned around the cable 22 with the cable 22 being located between the longitudinal groove 28 and the elongated channel 86. The keeper 14 is then manually pivoted so that the elongated channel 86 moves closer to the cable 22 and the longitudinal groove 28. Before the elongated channel 86 begins compressing the cable 22, the second U-bolt 21 is pivoted and moved into a position where the bight of the second U-bolt 21 engages the second U-bolt receiving area 92. The nuts 108 and 110 of both U-bolts 20 and 21 are then tightened, in any sequence, until the desired compressive force is applied between the keeper 14, the cable 22, and the body 12. The clamp 10 then takes the configuration as seen in FIG. 2.

While a particular embodiment has been chosen to illustrate the invention, it will be understood by those skilled in the art that various changes and modifications can be made therein without departing from the scope of the invention as defined in the appended claims.

What is claimed is:

1. A clamp for a line comprising:
   a body having a first portion for engaging the line;
   a keeper having a second portion for engaging the line;
   pivot means, coupled to said body and keeper, for pivotally coupling said body and said keeper, said pivot means including a shaft and shaft support pivotally receiving said shaft, said shaft having a longitudinal axis and said shaft and said keeper being integrally connected as a unitary one piece element to pivot together about said longitudinal axis, and said shaft support and said body being integrally connected as a unitary, one-piece element;
   bias means, coupled to said body and keeper, for biasing said keeper second portion away from said body first portion; and
   control means, coupled to said body and keeper, for controlling the angular position of said keeper relative to said body.

2. The clamp according to claim 1, wherein said bias means includes a torsion spring received around said shaft.

3. The clamp according to claim 1, wherein said shaft includes a pair of trunnions, and said shaft support includes a pair of fingers having a curved portion, the radius of curvature of each of said curved portions substantially equalling the radius of each of said trunnions.

4. A clamp comprising:

a body having a longitudinal groove for receiving a line, and a support located adjacent said longitudinal groove, said longitudinal groove and said support being integrally connected as a unitary, one-piece element;

a keeper having a compression member for securing the line against said longitudinal groove, said keeper also having a pivoting rod engaging said support, said pivoting rod pivoting within said support and pivoting said keeper, including said pivoting rod, about a pivoting axis coincident with the longitudinal axis of said pivoting rod to pivot said keeper between an open position and a closed position, said compression member and said pivoting rod being integrally connected as a one-piece element;

a spring, coupled to said body and keeper, for biasing said compression member away from said longitudinal groove; and at least one fastener extending between said body and said keeper for securing the compression member against the line.

5. The clamp according to claim 4, wherein said support comprises two support fingers and a support base.

6. The clamp according to claim 5, wherein said keeper has a pivoting end, and said pivoting rod extends from said pivoting end of said keeper, said pivoting rod comprising two trunnions located on opposite sides of said pivoting end.

7. A clamp comprising:

a body having a longitudinal groove for receiving a line, and a support located adjacent said longitudinal groove;

a keeper having a compression member for securing the line against said longitudinal groove, said keeper also having a pivoting rod engaging said support, said pivoting rod pivoting within said support and pivoting about a pivoting axis coincident with the longitudinal axis of said pivoting rod to pivot said keeper between an open position and a closed position;

a spring coupled to said body and keeper, for biasing said compression member away from said longitudinal groove; and at least one fastener extending between said body and said keeper for securing the compression member against the line, said support comprising two support fingers and a support base, said keeper having a pivoting end, and said pivoting rod extending from said pivoting end of said keeper, said pivoting rod comprising two trunnions located on opposite sides of said pivoting end, said support base having an upper concave surface, and said pivoting end having a lower convex surface that corresponds to said upper concave surface of said support base.

8. The clamp according to claim 7, wherein one of said support fingers engages one of said trunnions.

9. The clamp according to claim 8, wherein said spring is a torsion spring.

10. The clamp according to claim 9, wherein said at least one fastener comprises two fasteners.

11. The clamp according to claim 10, wherein said two fasteners are U-bolts, each U-bolt having a bight.

12. The clamp according to claim 11, wherein said keeper has first and second areas, each of said areas receiving one of said bights, respectively.

13. The clamp according to claim 12, wherein said body has apertures that receive said U-bolts.

14. A clamp comprising:

a body for receiving a line, said body having two support fingers and a support base integrally formed as a unitary, one-piece element;

a keeper having a compression member for securing the line against said body, said keeper also having a pivoting end, said pivoting end having two trunnions, each of said trunnions engaging one of said support fingers, respectively, said trunnions pivoting between said support fingers and said support base and pivoting about a pivot axis coincident with the longitudinal axis of both of said trunnions to pivot said keeper between an open position and a closed position;

a spring, located between one of said trunnions and one of said support fingers for biasing said compression member away from said body; and at least one fastener extending between said body and said keeper for securing said compression member against the line.

15. The clamp according to claim 14, wherein said spring is a torsion spring.

16. The clamp according to claim 15, wherein said body has a longitudinal groove for receiving the line.

17. The clamp according to claim 16, wherein said body has at least one aperture for receiving said at least one fastener.

18. The clamp according to claim 17, wherein said body has a pulling eye at one end and a clevis at another end, said at least one aperture being located between said pulling eye and said clevis.

19. The clamp according to claim 18, wherein said compression member has an elongated channel that extends substantially parallel to said longitudinal groove.

20. The clamp according to claim 19, wherein said at least one fastener comprises a first U-bolt and a second U-bolt, each U-bolt having a bight.

21. The clamp according to claim 20, wherein said keeper has first and second areas, each of said areas receiving one of said bights, respectively, and said at least one aperture comprises four apertures.

22. The clamp according to claim 21, wherein said first area of said keeper has protrusions positioned to contact said first U-bolt to limit rotation of said keeper relative to said closed position.

23. The clamp according to claim 22, wherein said first U-bolt is located entirely on one side of said longitudinal groove and said second U-bolt is located entirely on another side of said longitudinal groove.

24. A clamp comprising:

a body having a longitudinal groove for receiving a line, and a support projecting from said body and extending transverse to said longitudinal groove, said support having an upper support element and a lower support element forming a receiving slot;

a keeper having a compression member for securing the line against said longitudinal groove, said keeper also having a pivoting rod engaging said support, said pivoting rod pivoting within said support and pivoting said keeper about a pivoting axis coincident with the longitudinal axis of said pivoting rod to pivot said keeper between an open position and a closed position, said pivoting rod being insertable into said receiving slot in a direction transverse to said longitudinal groove;

a spring, coupled to said body and keeper, for biasing said compression member away from said longitudinal groove; and at least one fastener extending between said body and said keeper for securing the compression member against the line.

25. A clamp according to claim 24, wherein said upper support element is two spaced support extensions projecting away from said longitudinal groove in a direction transverse to said longitudinal groove.

26. A clamp according to claim 25, wherein said two spaced support elements have a lower curved area positioned entirely above a bottommost section of said pivoting rod.

* * * * *